(12) United States Patent
Jeong et al.

(10) Patent No.: US 11,868,249 B2
(45) Date of Patent: Jan. 9, 2024

(54) METHOD AND APPARATUS FOR REDUCING OPERATION OF GARBAGE COLLECTION

(71) Applicant: SAMSUNG ELECTRONICS CO., LTD., Suwon-si (KR)

(72) Inventors: Kwanhee Jeong, Suwon-si (KR); Hyojong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/880,104

(22) Filed: Aug. 3, 2022

(65) Prior Publication Data
US 2023/0033562 A1 Feb. 2, 2023

Related U.S. Application Data

(63) Continuation of application No. PCT/KR2022/007933, filed on Jun. 3, 2022.

(30) Foreign Application Priority Data

Aug. 2, 2021 (KR) .................. 10-2021-0101366

(51) Int. Cl.
*G06F 12/02* (2006.01)

(52) U.S. Cl.
CPC ...... *G06F 12/0253* (2013.01); *G06F 12/0246* (2013.01); *G06F 2212/7205* (2013.01)

(58) Field of Classification Search
CPC ............. G06F 12/0246; G06F 12/0253; G06F 2212/7205
See application file for complete search history.

(56) References Cited

U.S. PATENT DOCUMENTS

| 10,423,527 B2 | 9/2019 | Dragoljevic et al. |
| 10,671,526 B2 | 6/2020 | Ho et al. |
| 2007/0033240 A1 | 2/2007 | Barsness et al. |
| 2009/0037684 A1* | 2/2009 | Obata ................. G06F 12/0253 711/170 |
| 2014/0101209 A1* | 4/2014 | Hunt ..................... G06F 16/162 707/813 |

(Continued)

FOREIGN PATENT DOCUMENTS

| KR | 10-2008-0007462 | 1/2008 |
| KR | 10-0846499 | 7/2008 |

(Continued)

OTHER PUBLICATIONS

Search Report dated Aug. 24, 2022 issued in International Patent Application No. PCT/KR2022/007933.

*Primary Examiner* — Ryan Bertram
(74) *Attorney, Agent, or Firm* — Nixon & Vanderhye, P.C.

(57) ABSTRACT

A method, performed by an electronic device, includes: based on a target event associated with an application being initiated, transmitting initiation of the target event to a runtime environment of the application, and after transmitting the initiation of the target event to the runtime environment, based on a memory value allocated to the application exceeding a threshold value for determining whether to initiate a garbage collection, skipping performing the garbage collection and updating a bound memory value, defined in the garbage collection, and the threshold value.

20 Claims, 10 Drawing Sheets

(56) References Cited

U.S. PATENT DOCUMENTS

| | | | | |
|---|---|---|---|---|
| 2014/0281338 A1* | 9/2014 | Choi | ..................... | G06F 3/0688 |
| | | | | 711/170 |
| 2017/0075802 A1 | 3/2017 | Jamison | | |
| 2017/0123972 A1* | 5/2017 | Gopinath | .............. | G06F 3/0616 |
| 2019/0188129 A1* | 6/2019 | Ke | ........................ | G06F 3/0679 |

FOREIGN PATENT DOCUMENTS

| | | |
|---|---|---|
| KR | 10-2013-0073697 | 7/2013 |
| KR | 10-1950485 | 5/2019 |
| KR | 10-2020-0114009 | 10/2020 |
| WO | 2022/154380 | 7/2022 |

* cited by examiner

METHOD AND APPARATUS FOR REDUCING OPERATION OF GARBAGE COLLECTION

CROSS-REFERENCE TO RELATED APPLICATIONS

This application is a continuation of International Application No. PCT/KR2022/007933 designating the United States, filed on Jun. 3, 2022, in the Korean Intellectual Property Receiving Office and claiming priority to Korean Patent Application No. 10-2021-0101366, filed on Aug. 2, 2021, in the Korean Intellectual Property Office, the disclosures of which are incorporated by reference herein in their entireties.

BACKGROUND

1. Field

The disclosure relates to a method of avoiding an operation of a garbage collection.

2. Description of Related Art

Garbage may refer to a no longer used portion of a memory allocated to a program, an application, and the like. For example, when a memory is allocated to a certain object and the certain object is removed, the memory may still be represented as being used unless the memory is set to a usable memory. Such a memory that is not used but unusable may be referred to as garbage. The system may need an operation of transforming such garbage back to a useful memory, and this operation may be called a garbage collection. The garbage collection may refer to a method of dynamically managing the memory. A central processing unit (CPU) resource may be used to process the garbage collection that occurs during execution of the application, and this may be a factor that may cause a delay in allocating the CPU resource needed for the execution of the application.

SUMMARY

According to an example embodiment, the disclosure may provide a method, performed by an electronic device, including: based on a target event associated with an application being initiated, transmitting initiation of the target event to a runtime environment of the application, and based on transmitting the initiation of the target event to the runtime environment, based on a memory value allocated to the application exceeding a threshold value for determining whether to initiate a garbage collection, skipping performing the garbage collection and updating a bound memory value, defined in the garbage collection, and the threshold value.

The transmitting of the initiation of the target event to the runtime environment may include: setting a flag for determining whether to skip the performing of the garbage collection in the runtime environment, and the updating may include, based on the flag being set in the runtime environment, determining whether to skip the performing of the garbage collection.

The method may further include clearing the flag after a specified time elapses from the flag being set.

The method may further include based on the target event being terminated, transmitting the termination of the target event to the runtime environment, and in response to the termination of the target event being transmitted to the runtime environment, clearing the flag.

The updating may include, based on a maximum allowable free memory value for the application, updating the bound memory value and the threshold value.

The updating may include, in response to the memory value allocated to the application exceeding the bound memory value, updating the bound memory value to a value calculated by adding up the bound memory value to a value obtained by applying a preset weight to the maximum allowable free memory value for the application.

The updating may include, by setting the preset weight to an increased weight, delaying a first garbage collection to be performed after the initiation of the target event.

The updating may include updating the threshold value to a value calculated by subtracting a specified memory size value from the updated bound memory value.

The updating may include, in response to the memory value allocated to the application being less than or equal to the bound memory value, updating the bound memory value by adding up the bound memory value to a maximum free memory value for the application.

The method may further include, from when the flag is set to when the flag is cleared, based on a memory value newly allocated to the application exceeding the updated threshold value, skipping the performing of the garbage collection and repeating the updating.

The method may further include, based on the garbage collection being performed after the flag is cleared, based on a memory value allocated to the application based on the garbage collection being performed and a free memory value allowed for the application, updating the bound memory value and the threshold value.

According to an example embodiment, an electronic device may include: a processor configured to: based on a target event associated with an application being initiated, transmit initiation of the target event to a runtime environment of the application, after transmitting the initiation of the target event to the runtime environment, based on a memory value allocated to the application exceeding a threshold value for determining whether to initiate a garbage collection, skip performing the garbage collection and update a bound memory value, defined in the garbage collection, and the threshold value.

According to an example embodiment, an electronic device, based on a target event associated with an application being initiated, and a memory value allocated to the application exceeding a threshold value for determining whether to initiate a garbage collection, may skip performing the garbage collection and update a bound memory value, defined in the garbage collection, and the threshold value. In other words, the electronic device, from when the target event is initiated to when the flag set in a runtime is cleared, may skip the performing of the garbage collection. Accordingly, the electronic device, by minimizing/reducing a garbage collection operation, may improve execution performance of the target event and minimize/reduce runtime performance degradation. Furthermore, compared to a typical high-specification memory terminal, the electronic device, even after the termination of the target event, may not need to force a call for a garbage collection, and thus, may minimize/reduce the call for the garbage collection and prevent/reduce the runtime performance degradation.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
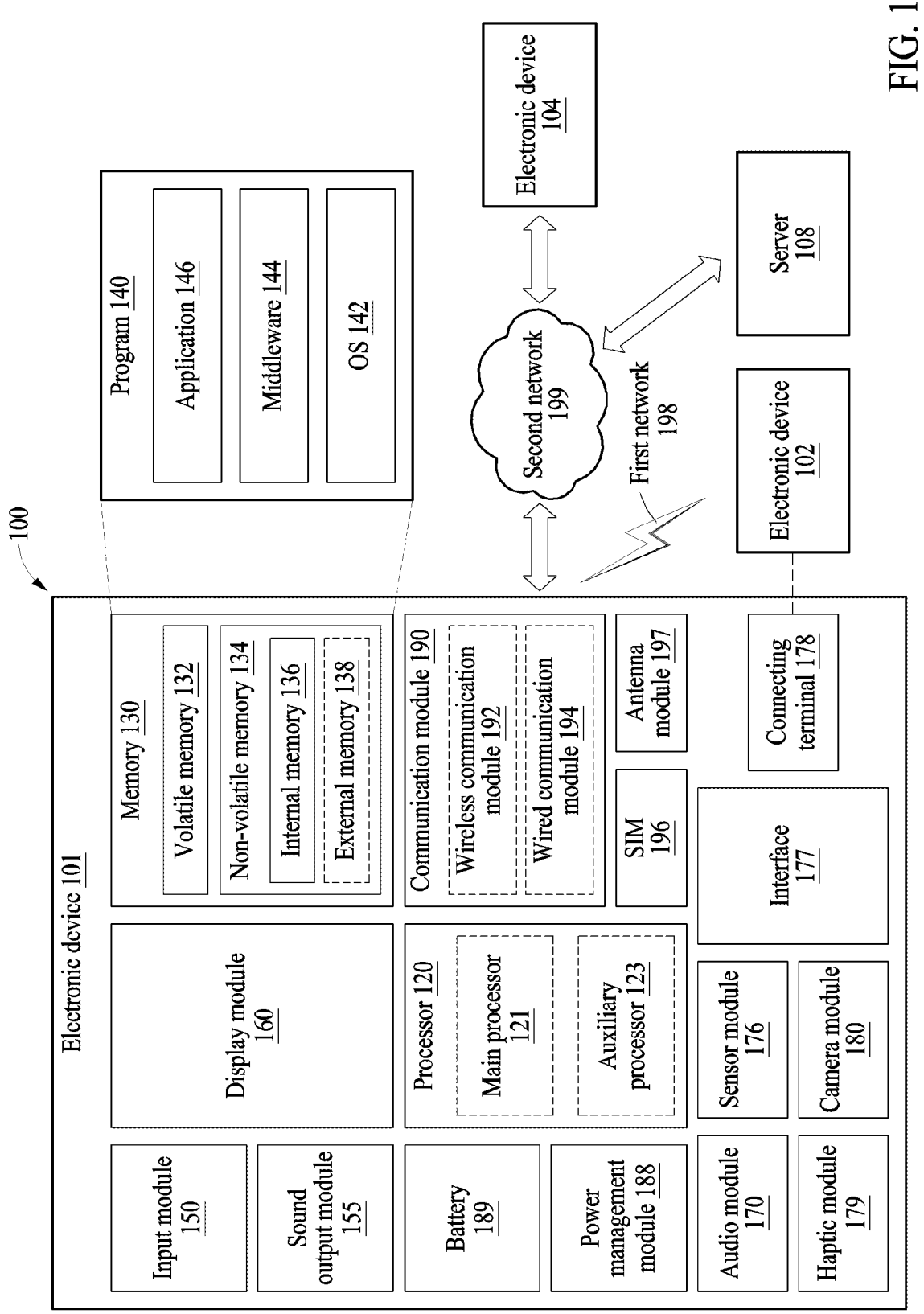
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added in the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. The server 108 may include a processor, a communication module, and a memory. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
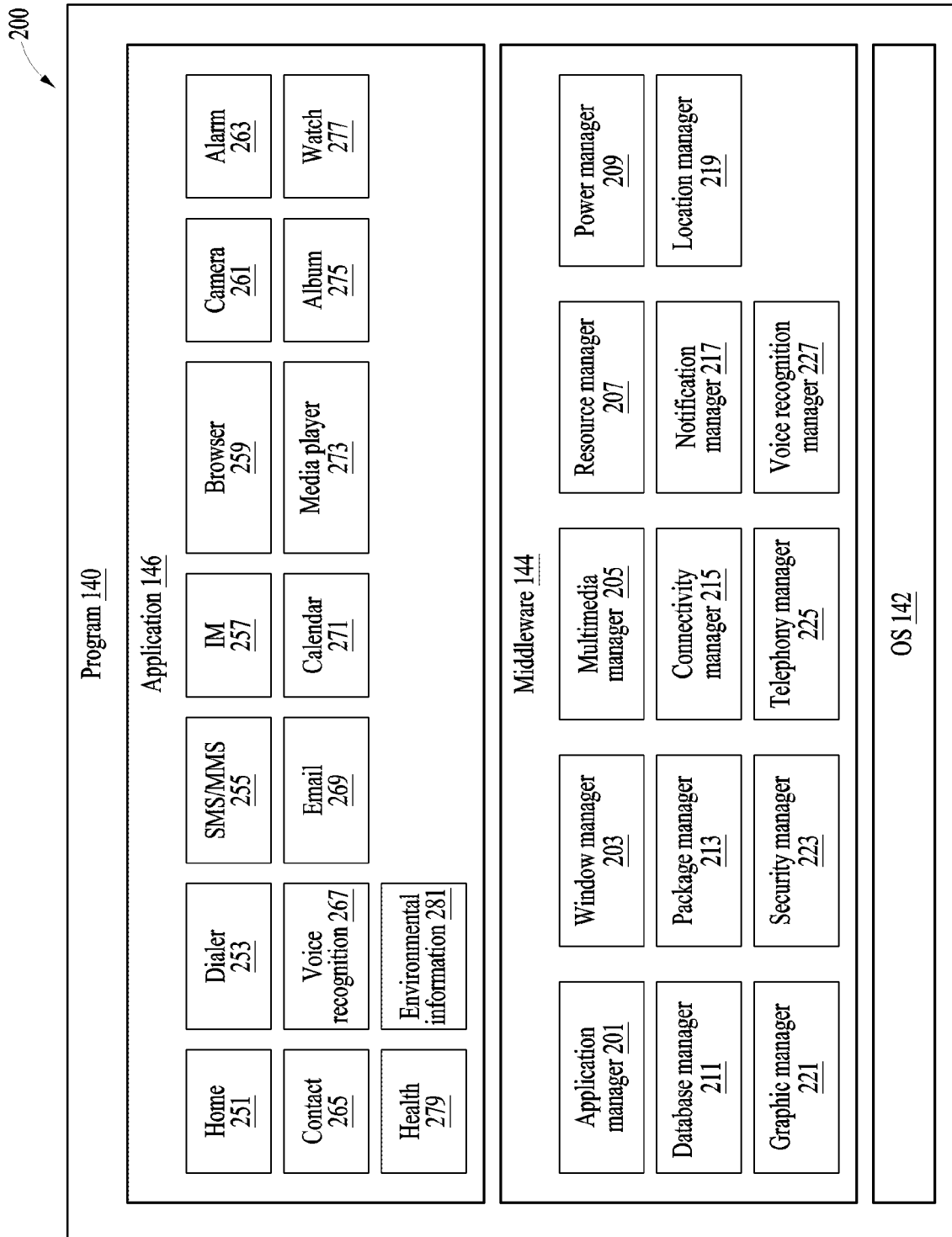
FIG. 2 is a block diagram illustrating an example program according to various embodiments.

FIG. 2 is a block diagram 200 illustrating an example program 240 according to various embodiments. According to an example embodiment, the program 240 may include an OS 242 to control one or more resources of the electronic device 101, middleware 244, or an application 246 executable by the OS 242. The OS 242 may include, for example, Android™, iOS™, Windows™, Symbian™, Tizen™, or Bada™. At least part of the program 240, for example, may be pre-loaded on the electronic device 101 during manufacture, or may be downloaded from or updated by an external electronic device (e.g., the electronic device 102 or 104, or the server 108) during use by a user.

The OS 242 may control management (e.g., allocation or deallocation) of one or more system resources (e.g., a process, a memory, or a power source) of the electronic device 101. The OS 242 may additionally or alternatively include at least one other driver program to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 244 may provide various functions to the application 246 such that a function or information provided from one or more resources of the electronic device 101 may be used by the application 246. The middleware 244 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the lifecycle of the application 246. The window manager 203, for example, may manage one or more graphical user interface (GUI) resources that are used on a screen. The multimedia manager 205, for example, may identify one or more formats to be used to play media files and may encode or decode a corresponding one of the media files using a codec appropriate for a corresponding format selected from the one or more formats. The resource manager 207, for example, may manage the source code of the application 246 or a memory space of the memory 130. The power manager 209, for example, may manage the capacity, temperature, or power of the battery 189 and may determine or provide related information to be used for the operation of the electronic device 101 based at least partly on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 246. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and may receive, from the server 108, a command corresponding to a function to be executed on the electronic device 101, based at least partly on the voice data, or text data converted based at least partly on the voice data. According to an example embodiment, the middleware 244 may dynamically delete some existing components or add new components. According to an example embodiment, at least part of the middleware 244 may be included as part of the OS 242 or may be implemented as another software separate from the OS 242.

The application 246 may include, for example, a home application 251, a dialer application 253, a short message service (SMS)/multimedia messaging service (MMS) application 255, an instant message (IM) 257, browser 259, a camera application 261, an alarm application 263, a contacts application 265, voice recognition 267, an email application 269, a calendar application 271, a media player application 273, an album application 275, a watch application 277, a health application 279 (e.g., for measuring the degree of workout or biometric information, such as blood sugar), or an environmental information application 281 (e.g., for measuring air pressure, humidity, or temperature information). According to an example embodiment, the application 246 may further include an information exchanging application (not shown) for supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or some of the components of the external electronic device (e.g., a display module or a camera module). The device management application may additionally or alternatively support installation, deletion, or update of an application that operates in an external electronic device.

A virtual machine (VM) may represent software acting as an interface between compiled binary code and a processor, which actually executes an instruction of a program. Once the VM is provided on a platform, a Java program called bytecode may be executed on the platform. Java is designed to allow application programs to be rewritten suitably for each platform or to be executed on every platform without recompiling, using the VM.

In addition, the application programs executed by such a VM may be referred to as a VM application (hereinafter, an 'application'). The VM may execute various types of Java components in middleware (e.g., the middleware 244 of FIG. 2). According to an example embodiment, when the application (e.g., the application 246 of FIG. 2) is executed, an OS (e.g., the OS 242 of FIG. 2) may allocate a memory region needed by the executed application to the VM. The allocated memory region may include a heap memory. In this case, the heap memory may represent a memory storing a Java object allocated from a VM region for Android for each process.

In an electronic device of an Android terminal, the process may be performed using a heap memory of a predetermined value. Because the Android terminal basically uses a Java platform, the heap memory may be retrieved through a garbage collection. In this case, garbage may refer to a no longer used region of a memory allocated to the application, and an operation of transforming such garbage back to a useful memory may be referred to as a garbage collection. In other words, the garbage collection may include an operation of finding and deleting an object no longer needed because a developer does not explicitly clear a memory using program code. The garbage collection may be performed by a garbage collector. The garbage collector, when a memory to be allocated to the application is insufficient, may secure a free memory by removing garbage no longer used in the heap memory of the application. The garbage collector may automatically perform the garbage collection when a certain condition is satisfied. When a garbage collection is performed, a CPU resource of a terminal may be used to perform the garbage collection, and thus, runtime performance may be degraded based on hardware performance of the terminal. When an activity manager (e.g., the activity manager 201 of FIG. 2) launches an application on an Android terminal, a runtime environment in which the application operates may be generated.

Zygote may refer, for example, to a process to reduce a loading time of an application, and the application may operate on a forked process through the zygote. A process configured to execute an application on an Android terminal may be forked through the zygote. There are a maximum heap memory value ('heapgrowthlimit') that may be used in each process for executing an application and a memory threshold value for determining initiation of a garbage collection. The maximum heap memory value and the memory threshold value (hereinafter, a 'threshold value') may be determined based on a heap parameter of an Android terminal and information stored in an Android manifest file ('androidmanifest.xml') independently possessed by a process for an application.

The Android terminal may clean up an object no longer needed during execution of a process to not fail to allocate a memory to an application. In the Android terminal, when a certain condition is satisfied during execution of the application, a garbage collector may automatically perform a garbage collection. For example, the garbage collection may be performed upon an entry to an application, during use of the application, upon a switch to a background, upon a screen rotation, and the like. In this case, a user of the Android terminal may experience a slowness issue because the performing of the garbage collection may use a CPU resource.

On the other hand, when a target event associated with an application occurs, an electronic device according to an example embodiment may skip automatically performing a garbage collection until the target event is terminated. Therefore, the electronic device may avoid a slowness issue during execution of the target event and provide the user with an optimal user experience (UX).

As described above, applications executed by an Android terminal each may have their own heap memory. In the Android terminal, various memory values used to perform a garbage collection may be determined through a system property. The system property may represent a property value of a system that is automatically set when a Java VM is initiated. A system property of an electronic device of a smart watch, for example, may be set as below in Table 1.

TABLE 1

| Property | Set value |
| --- | --- |
| heapgrowthlimit | 128 (megabytes) |
| heapmaxfree | 3 (megabytes) |

TABLE 1-continued

| Property | Set value |
|---|---|
| heapminfree | 512 (kilobytes) |
| heapsize | 384 (megabytes) |
| heapstartsize | 2 (megabytes) |
| heaptargetutilization | 0.75 |

In Table 1, the 'heapgrowthlimit' property may represent a maximum memory value (hereinafter, a 'maximum heap memory value') allowed for a heap memory allocated to an application. The 'heapmaxfree' property may represent a maximum free memory value (hereinafter, 'maximum allowable free memory value') allowed for an application. In this case, the free memory may represent a free memory space that an application may have before a garbage collection is performed. The 'heapminfree' property may represent a minimum free memory value (hereinafter, a 'minimum allowable free memory value') allowed for an application. The 'heapsize' property may represent a maximum value of a heap memory that may be allocated to an application in an Android terminal. For example, 'heapgrowthlimit' for a specific application may be determined to be a value less than or equal to 'heapsize'. The 'heapstartsize' property may represent a starting value of a heap memory to be allocated after a process for an application is generated. The 'heaptargetutilization' property may represent an ideal target utilization of a heap memory. The free memory value allowed for the application may be determined between a maximum allowable free memory value and a minimum allowable free memory value, based on a target utilization of the heap memory. When the heap memory may need to be additionally allocated to the application, the 'heapminfree' property and the 'heapmaxfree' property with the 'heaptargetutilization' property may determine a size of the additionally allocated heap memory.

The maximum heap memory value ('heapgrowthlimit') representing a maximum memory value allowed for a heap memory for each application may be independently determined. The maximum heap memory value determined for an application may be determined based on a 'largeheap' property that is stored in an Android manifest file independently possessed by a process of the application. Generally, the 'largeheap' property is set to 'false'. However, when the 'largeheap' property is set to 'true', the maximum heap memory value ('heapgrowthlimit') of the application may be reset. For example, the maximum heap memory value ('heapgrowthlimit') of the application may be reset to a property value of 'heapsize' representing a maximum value of a heap memory to be allocated to an application in an Android terminal.

For example, referring to Table 1, a maximum heap memory value ('heapgrowthlimit') for a specific application executed on Android may be set to 128 megabytes, however, by setting the 'largeheap' property to 'true', the maximum heap memory value may be reset to 384 megabytes, which is a value of 'heapsize'.

An Android terminal may generate and execute a process corresponding to an application through a zygote process. When the process is forked by the zygote, a memory may be allocated as a starting value ('heapstartsize') of a heap memory.

A garbage collection start byte (GC start byte) for determining initiation of a garbage collection may be set by a memory value allocated to a current application. For example, when a process corresponding to an application is forked by zygote, and a memory is allocated as a starting value of a heap memory, the GC start byte may be set based on the starting value of the heap memory. The GC start byte may represent a threshold value for determining the initiation of the garbage collection. In other words, when the memory value allocated to the application exceeds the GC start byte, the garbage collection may be initiated. Hereinafter, the GC start byte will be described as a threshold value for determining initiation of a garbage collection.

The threshold value for determining initiation of a garbage collection may be set based on a maximum allowable free memory value ('heapmaxfree'), a minimum allowable free memory value ('heapminfree'), and a target utilization ('heaptargetutilization') of a heap memory. When a garbage collection is performed, to perform a next garbage collection after a current garbage collection, a threshold value for determining initiation of a garbage collection may be updated. Furthermore, a threshold value of a garbage collection may be determined based on a target footprint. The target footprint may represent a bound memory value defined for each application in a garbage collection. The bound memory value may represent a limited value for executing a garbage collection before a memory that is allocated, after execution of an application, to the application exceeds the bound memory value defined in the garbage collection. The threshold value for determining initiation of a garbage collection may be determined based on the bound memory value set in the garbage collection and determined to be a value less than or equal to the bound memory value. Hereinafter, the target footprint will be described as the bound memory value. When the garbage collection is performed, the bound memory value is updated, and based on the updated bound memory value, the threshold value of the garbage collection may be updated.

Referring to Table 1, a process of updating a threshold value associated with a garbage collection will be described below as an example. A weight for updating the threshold value and a bound memory value may be preset for an Android terminal, and the weight may be assumed by way of non-limiting example to be set to 3.0. When a process configured to execute an application is forked by zygote, the bound memory value may be assumed to be set to 6 megabytes and the threshold value of the garbage collection to a value less than 6 megabytes. In this case, when a memory of 6 megabytes is allocated to the application for an entry to the application, the memory value allocated to the application may exceed the threshold value, and a processor may thus automatically initiate the garbage collection. In addition, after the garbage collection is performed, to determine initiation of a next garbage collection, the processor may update the bound memory value and the threshold value, based on a heap memory value allocated to the application when the garbage collection is performed.

For example, a bound memory value for a garbage collection in an Android terminal may generally be updated as in Equation 1.

updated bound memory value=heap memory value allocated to application+(allowable free memory value×weight)  [Equation 1]

In Equation 1, the allowable free memory value denotes a free memory value allowed for an application after the garbage collection is performed. As described above, the allowable free memory value may be determined between a maximum allowable free memory value and a minimum allowable free memory value, based on a target utilization ('heaptargetutilization') of a heap memory. More specifically, the allowable free memory value may be calculated as in Equation 2.

allowable free memory value=minimum allowable free memory value+(maximum allowable free memory value−minimum allowable free memory value)×target utilization  [Equation 2]

For example, assuming that the target utilization is 1, the allowable free memory value may be the same value as the maximum allowable free memory value (e.g., 2 megabytes). In this case, according to Equation 1, the bound memory value may be updated to 6 megabytes+2 megabytes×3=12 megabytes. In addition, the threshold value of the garbage collection may be updated based on the updated bound memory value and to a value less than or equal to 12 megabytes. Thereafter, when an event occurs during execution of the application, a memory may additionally be allocated, and when the additionally allocated memory exceeds the updated threshold value, a processor may automatically perform a next garbage collection. Thereafter, through a mechanism as described above, the processor may reset the bound memory value and the threshold value. The bound memory value may use a heap memory by increasing up to a maximum heap memory value ('heapgrowthlimit') for the application, and when the bound memory value may not further increase, out of memory (OOM) may occur, and the application may shut down.

Figure 3:
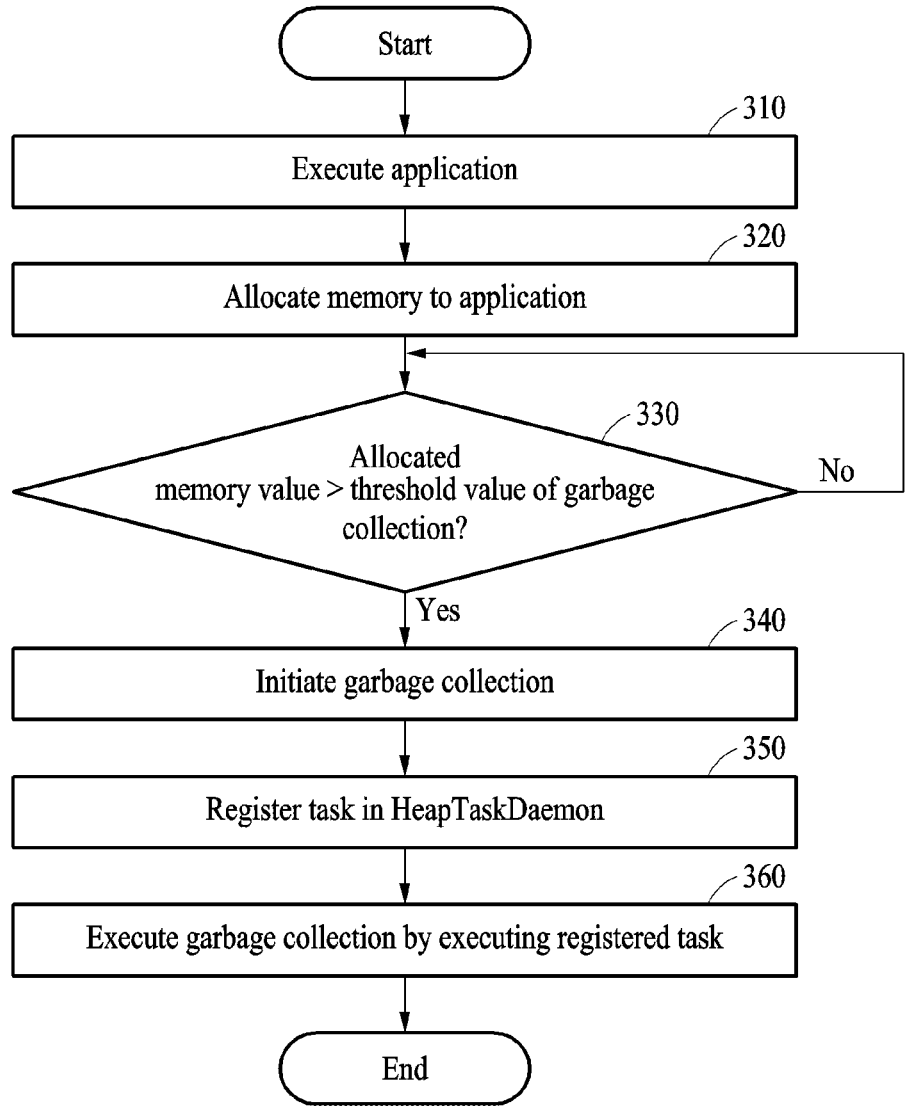
FIG. 3 is a flowchart illustrating an example process of a basic operation of a garbage collection in an Android terminal, according to various embodiments.

FIG. 3 is a flowchart illustrating an example process of a basic operation of a garbage collection in an Android terminal, according to various embodiments.

In operation 310, an electronic device of the Android terminal may execute an application. A process may be forked through zygote, and the application may be executed through the forked process.

In operation 320, the electronic device, when the executed application requests memory allocation, may perform the memory allocation in a heap memory region within a maximum heap memory value ('heapgrowthlimit') set for the application. The memory allocation request may occur when an event associated with the application is initiated. The event may include various actions in the application. For example, the event may include an entry action to the application. In this case, the event may start with initiation of the entry to the application and end with completion of the entry to the application. As another example, the event may include an action of changing a screen mode according to a rotation state of the electronic device. For example, the action of changing the screen mode may represent an action of changing the screen mode from a landscape mode to a portrait mode or from the portrait mode to the landscape mode.

In operation 330, the electronic device, may determine whether a memory value allocated to the application exceeds a threshold value for determining initiation of a garbage collection set for the application. For example, the electronic device may determine whether a memory value, calculated by adding up a memory value previously allocated to the application and the memory value additionally allocated in response to the event associated with the application, exceeds the threshold value.

In operation 340, when the memory value allocated to the application exceeds the threshold value of a garbage collection (330—Yes), the electronic device may determine the initiation of the garbage collection. When the memory value allocated to the application is less than or equal to the threshold value of a garbage collection (330—No), the electronic device may perform memory allocation constantly upon the request for the memory allocation from the application without initiating the garbage collection.

In operation 350, when a garbage collection is initiated, the electronic device may register a task in a HeapTaskDaemon thread to perform the garbage collection. In an Android terminal, a garbage collection may be generally executed in a background thread of HeapTaskDaemon.

Figure 4:
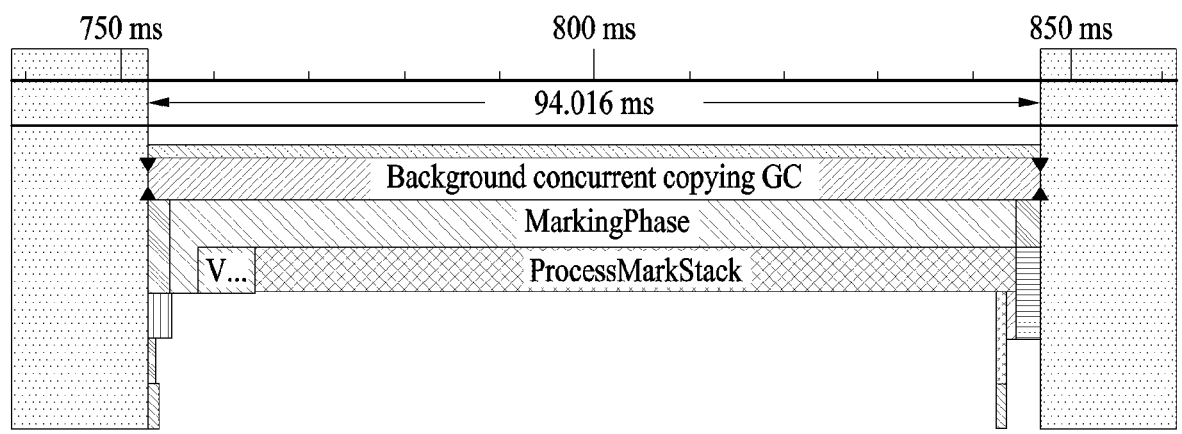
FIG. 4 is a diagram illustrating an example garbage collection executed in a background thread according to various embodiments.

In operation 360, the electronic device may perform the garbage collection by executing the task registered in HeapTaskDaemon. In other words, when the task registered in HeapTaskDaemon is executed, a garbage collector may perform the garbage collection. FIG. 4 is a diagram illustrating a 94 milliseconds (ms) garbage collection executed in a HeapTaskDaemon thread. As illustrated in FIG. 4, as a memory value allocated to an application is increased, more CPU resources may be consumed by performing a garbage collection.

When the performing of the garbage collection is completed, based on the memory value allocated to the application after the garbage collection is performed, to perform a next garbage collection, a bound memory value and a threshold value may be updated. For example, each of the bound memory value and the threshold value may increase or decrease by being updated, and such an increase or decrease may be determined based on the memory value allocated to the application when the performing of the garbage collection is completed.

Figure 5A:
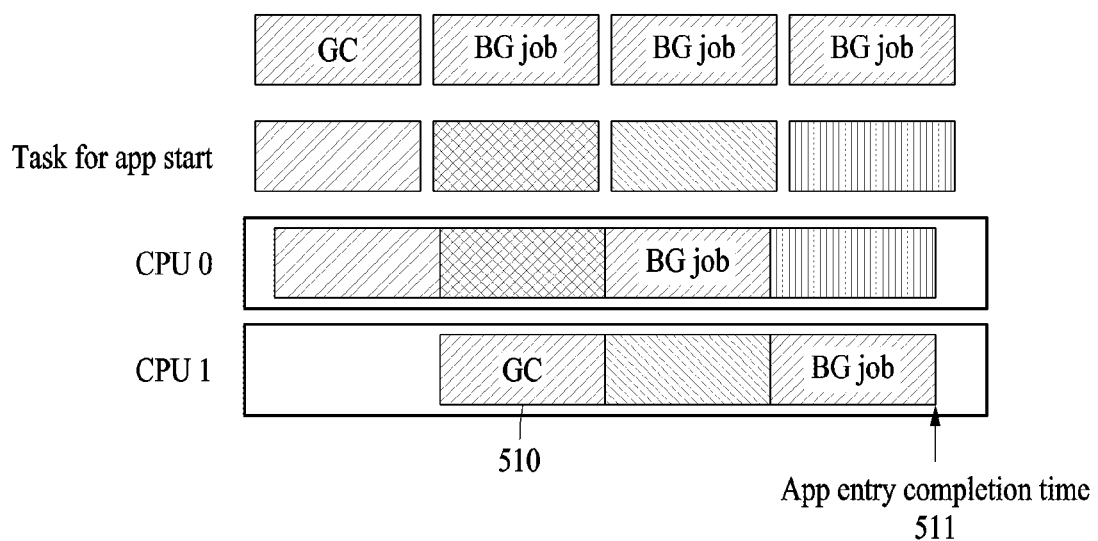
FIGS. 5A and 5B are diagrams each illustrating an example process of a garbage collection performed in a low-specification memory terminal, according to comparative example embodiments.
Figure 5B:
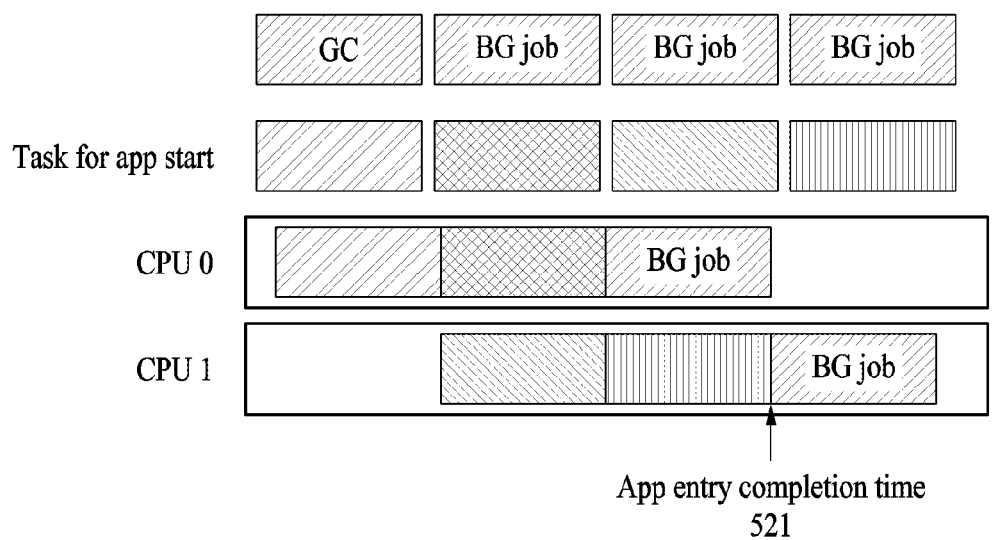

FIGS. 5A and 5B are diagrams each illustrating an example process of a garbage collection performed in a low-specification memory terminal, according to comparative example embodiments.

In a low-specification Android terminal, the properties of a heap parameter may be set to be considerably low. In the low-specification memory terminal, when an event associated with an application is initiated, and a memory is additionally allocated to the application, a memory value allocated to the application may frequently exceed a threshold value of the garbage collection. Hereinafter, the event associated with an application may be, for example, described as an application entry event, but the event may not be limited thereto.

For example, in the low-specification memory terminal, when the application is executed, and the application entry event occurs, a memory value allocated to Java objects may frequently exceed the threshold value of the garbage collection. Accordingly, during an application entry, the garbage collection may be frequently called, and thus, a user may experience a slowness issue and an optimal UX may not be readily provided. More specifically, the low-specification memory terminal may use limited CPU resources to process the garbage collection occurring during the application entry, and this may be a factor causing a delay in allocating a resource needed for the application entry. As a result, the garbage collection occurring during the application entry may degrade application entry performance.

FIG. 5A illustrates an example of performing a garbage collection while the application entry event is executed, and FIG. 5B illustrates an example of not performing a garbage collection until the application entry is completed. In FIG. 5A, when a garbage collection 510 is performed while the application entry event is executed, a CPU resource may need to be used to perform the garbage collection, and an application entry completion time 511 may thus be delayed. For example, a processor may need to perform a plurality of jobs to enter the application, and while performing the jobs using the CPU resource, when a memory value allocated to the application exceeds the threshold value, the processor may need to perform the garbage collection 510. On the other hand, in FIG. 5B, when a processor does not perform the garbage collection until the application entry is completed, a CPU resource is not consumed by the garbage collection, and an application entry completion time 521 may thus decreased, compared to when the garbage collection is performed during the application entry. Therefore, a terminal user in FIG. 5B may less experience the slowness issue, compared to a terminal user in FIG. 5A.

Figure 6:
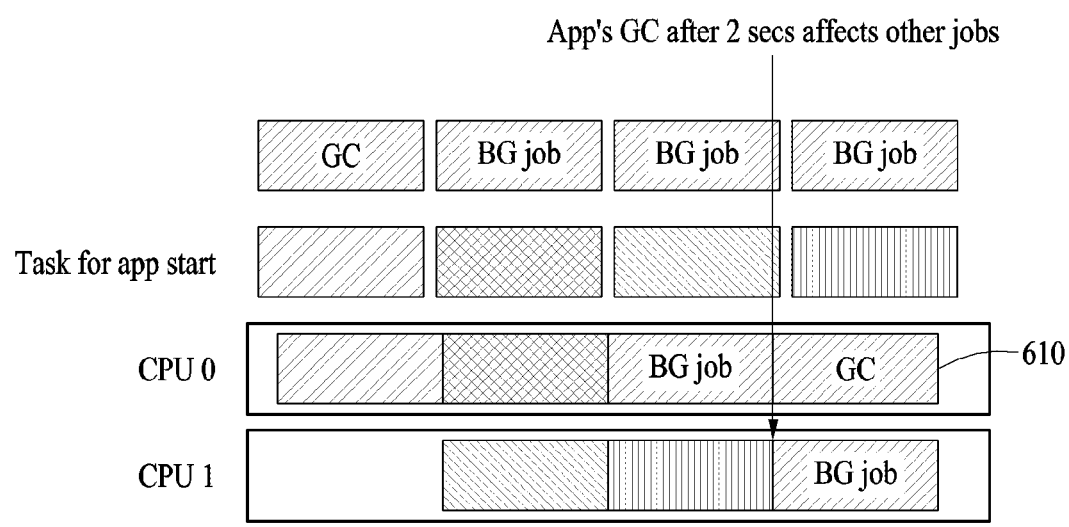
FIG. 6 is a diagram illustrating an example process of minimizing/reducing performing of a garbage collection in a high-specification memory terminal, according to various embodiments.

FIG. 6 is a diagram illustrating an example process of minimizing/reducing performing of a garbage collection in a high-specification memory terminal according to various embodiments.

In a high-specification memory Android terminal, the properties of a heap parameter may be set to be relatively high compared to properties of a heap parameter in a low-specification memory terminal. However, compared to the low-specification memory terminal, the high-specification memory terminal may allocate a larger memory to an application, and a garbage collection may frequently occur in the high-specification memory terminal. For example, an entry event associated with the application may be assumed to occur. To minimize/reduce the occurrence of the garbage collection during an application entry, the high-specification memory terminal may update a bound memory value and a threshold value of the garbage collection. For example, the high-specification memory terminal may update the bound memory value and the threshold value of the garbage collection, based on a maximum heap memory value ('heapgrowthlimit'). In this case, an increased bound memory value and an increased threshold value of the garbage collection may prevent/reduce the garbage collection from being performed after the application entry is completed, and the high-specification memory terminal may thereafter force a call for a garbage collection 610 and reset the bound memory value and the threshold value of the garbage collection. This will be described in greater detail below with reference to FIG. 7.

Figure 7:
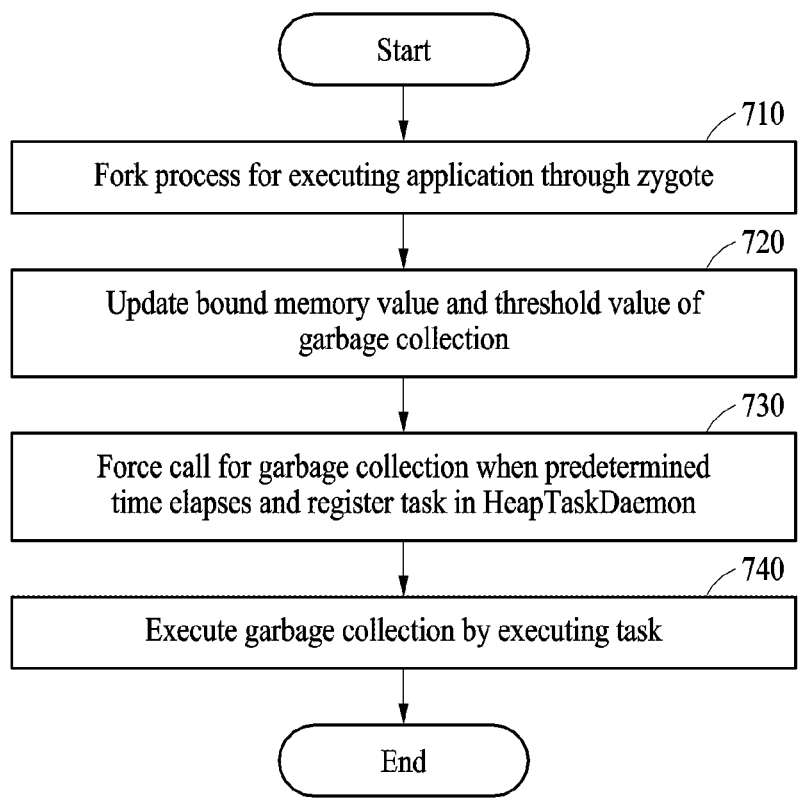
FIG. 7 is a flowchart illustrating an example process of minimizing/reducing performing of a garbage collection in a high-specification memory terminal, according to various embodiments.

FIG. 7 is a flowchart illustrating an example process of minimizing/reducing performing of a garbage collection in a high-specification memory terminal according to various embodiments.

Referring to FIG. 7, a process of performing the garbage collection when an application entry event occurs in the high-specification memory terminal will be described.

In operation 710, an electronic device of an Android terminal may fork a process configured to execute an application through zygote.

In operation 720, when the process for executing the application is forked, the electronic device may update a bound memory value and a threshold value of the garbage collection. For example, the electronic device may update the bound memory value and the threshold value of the garbage collection, based on a maximum heap memory value. For example, to minimize/reduce the occurrence of the garbage collection during an application entry, the electronic device may increase the bound memory value to the maximum heap memory value ('heapgrowthlimit'). For example, the electronic device may update the bound memory value to a maximum heap memory value of 256 megabytes or 512 megabytes according to an application type. In addition, the electronic device may update the threshold value of the garbage collection, based on the updated bound memory value. For example, the electronic device may increase the threshold value of the garbage collection to a value half of the bound memory value. In other words, the electronic device may update the threshold value of the garbage collection to a value half of the maximum heap memory value. By increasing the threshold value of the garbage collection, based on the maximum heap memory value, the electronic device may prevent/reduce the garbage collection from being initiated even when a memory is allocated to the application during the application entry.

In operation 730, the electronic device may force a call for the garbage collection such that a garbage collector decreases the bound memory value and the threshold value when a predetermined (e.g., specified) time elapses and register a task in a HeapTaskDaemon thread.

For example, the predetermined time may be 2 seconds. When the bound memory value is updated to the maximum heap memory value, and the threshold value of the garbage collection is updated to a value half of the maximum heap memory value, the memory allocated to the application may not exceed the threshold value of the garbage collection, even after the application entry is completed, and the garbage collection may thus not occur. When the garbage collection does not occur, garbage of a memory not used in the application may not be removed. Accordingly, the electronic device may readjust the threshold value of the garbage collection by forcing a call for the garbage collection. To execute the garbage collection, the electronic device may register a task in the HeapTaskDaemon thread, which is a background thread in which the garbage collection is executed.

In operation 740, a processor of the electronic device may perform the garbage collection by executing the registered task when a predetermined time elapses. When the task registered in the HeapTaskDaemon thread is executed, the garbage collector may perform the garbage collection. In this case, the electronic device, based on a memory value allocated to the application when the garbage collection is performed, may readjust the bound memory value and the threshold value. In other words, the electronic device may decrease the bound memory value and the threshold value again, and thus, the garbage collection may be performed after the application entry.

However, the method of minimizing/reducing a garbage collection in the high-specification memory terminal, according to comparative example embodiments described above, may unnecessarily force a call for the garbage collection after the application entry is completed, even in a case that a memory value allocated to an application when a process is forked through zygote does not exceed the threshold value of the garbage collection. The forcibly called garbage collection may use an additional CPU resource and thus may affect runtime performance of the application. In addition, in the method of minimizing/reducing the garbage collection, according to comparative example embodiments described above, in a case of a reentry to an application, a process configured to execute the application may not be forked, and a resource may be simply reloaded, and when the process is not forked, the bound memory value and the threshold value of the garbage collection may not be updated. In other words, during the reentry to the application, the garbage collection may occur, and this may affect entry performance of the application.

Accordingly, a garbage collection performed during an application entry may cause a delay in a thread for performing a job needed for the application entry within a limited CPU resource, and entry performance of the application may degrade. A high-specification memory terminal may increase a bound memory value and a threshold value of a garbage collection, based on a maximum heap memory value for all applications, and then, may force a call for the garbage collection, and may thus affect runtime performance of the applications as well after an entry to the applications is completed. Furthermore, the method of minimizing/reducing the garbage collection in the high-specification memory terminal described above may be applied when a process corresponding to an application is forked through zygote and may not be applied in a case of a reentry to the application, and thus may not optimize a UX.

Figure 8:
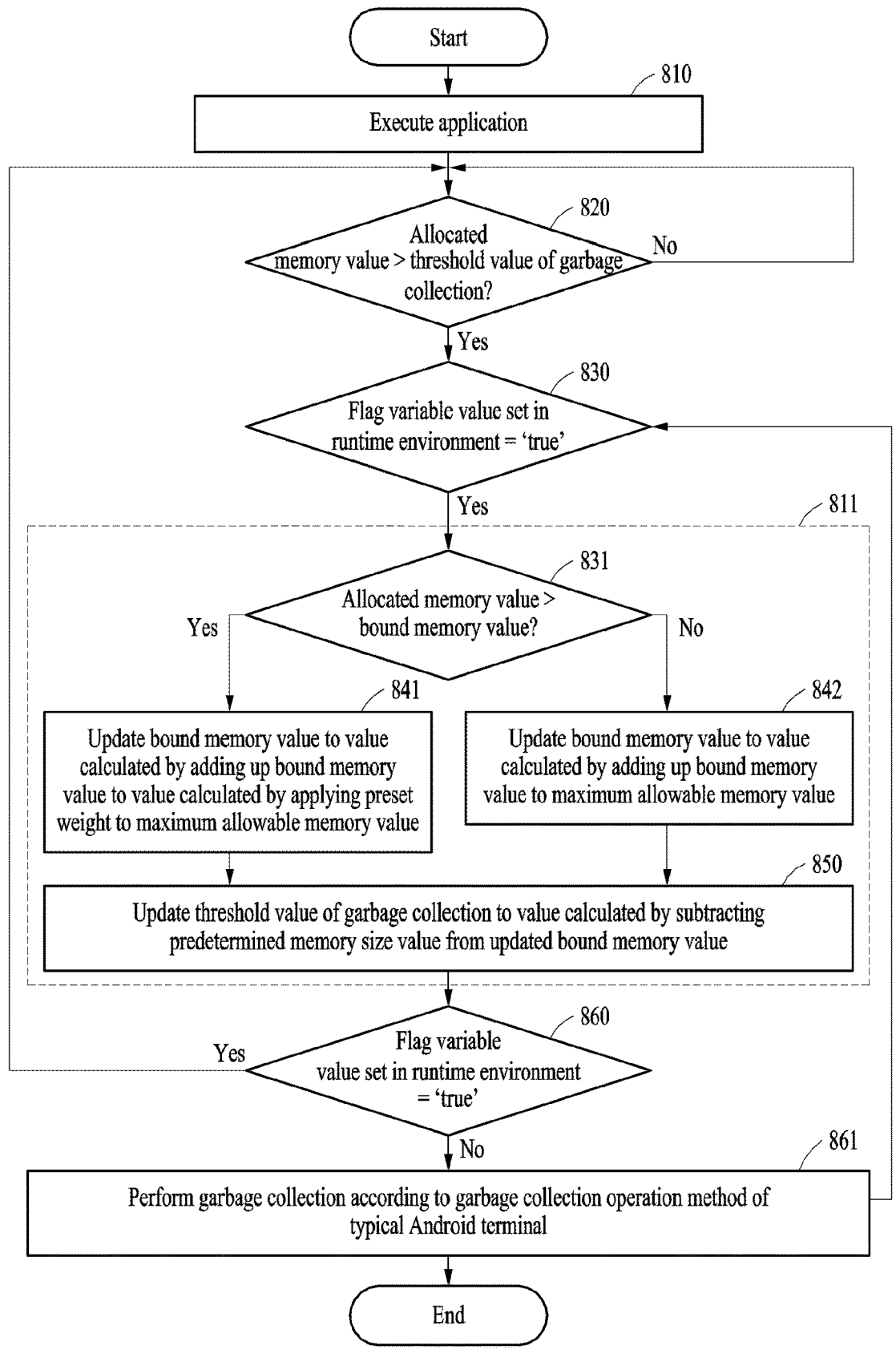
FIG. 8 is a flowchart illustrating an example process of minimizing/reducing a garbage collection in an electronic device, according to various embodiments.

FIG. 8 is a flowchart illustrating an example process of minimizing/reducing a garbage collection in an electronic device, according to various embodiments.

In operation 810, the electronic device (e.g., the electronic device 101 of FIG. 1) according to an example embodiment may execute an application. As described above, a process configured to execute the application may be forked through zygote. The application may be performed by the process forked through the zygote. The electronic device may receive a request for memory allocation from the application to execute a target event associated with the application and allocate a memory in a heap memory region.

In addition, the electronic device, when the target event associated with the application is initiated, may transmit the initiation of the target event to a runtime environment of the application. An Android-based OS may use an activity manager (e.g., the application manager 201 of FIG. 2) to manage events occurring in an application. For example, the activity manager may manage an execution state of a process for an executed application and information on an event caused by the execution of the process. When the activity manager launches the application, a runtime environment in which the launched application performs may be generated.

An application, by calling an application programming interface (API), may transmit initiation of a target event associated with the application to a runtime environment of the application. The API may refer to an interface configured to control a function provided by an OS or a programming language.

For example, the target event may be assumed to be an application entry event. When an entry to the application is initiated, the electronic device may request a launch activity in an application thread through a remote procedure call (RPC) of an activity manager service in a system server. In this case, the application may call an API for transmitting the initiation of the application entry to a runtime environment of the application. The application, by calling the API for transmitting the initiation of the application entry, may transmit the initiation of the application entry to the runtime environment. In this case, the initiation of the application entry may include initiation of a first entry to the application after a process configured to execute the application is forked through zygote and initiation of a reentry to the application.

As another example, the target event may be an event of changing a screen mode. In this case, similarly, when the electronic device detects a change of a rotation state during execution of the application, the electronic device may request the launch activity in the application thread through the RPC of the activity manager service in the system server. In this case, the application may call an API for transmitting initiation of a screen mode change to the runtime environment of the application. The application may transmit the initiation of the screen mode change of the application to the runtime environment of the application through the API call.

In operation 820, the electronic device, may determine whether a memory value allocated to the application exceeds a threshold value for determining whether to initiate a garbage collection.

For example, when the memory value allocated to the application does not exceed the threshold value of the garbage collection, the electronic device may not initiate the garbage collection. When the memory value allocated to the application is less than or equal to the threshold value of the garbage collection (820—No), the electronic device may perform memory allocation constantly upon request for the memory allocation from the application without initiating the garbage collection and may not execute the garbage collection until the allocated memory value exceeds the threshold value.

When the memory value allocated to the application exceeds the threshold value of the garbage collection (820—Yes), the electronic device may initiate the garbage collection.

In operation 830, the electronic device according to an example embodiment may verify a flag set in the runtime environment of the application. By verifying the flag set in the runtime environment of the application, the electronic device may determine whether to skip performing the initiated garbage collection. For example, when a variable value of the flag set in the runtime environment is 'true', the electronic device may skip the performing of the garbage collection. When the variable value of the flag set in the runtime environment is 'false', the electronic device may not skip the performing of the garbage collection and perform the garbage collection according to a garbage collection operation method of a typical Android terminal. When skipping the performing of the initiated garbage collection, the electronic device may update a bound memory value and the threshold value of the garbage collection.

According to an example embodiment, the electronic device may set a flag for determining whether to skip performing a garbage collection in a runtime environment of a previous application, and based on the flag set in the runtime environment, determine whether to skip the performing of the garbage collection. For example, when an application calls an API for transmitting initiation of a target event and transmits the initiation to a runtime environment of the application, the electronic device may set a flag for avoiding the garbage collection in the runtime environment. More specifically, the application executed in the electronic device may call an API for setting the flag for avoiding the garbage collection, and the runtime environment may set the flag for skipping the garbage collection through the API called by the application.

For example, when a memory value allocated to the application exceeds the threshold value of the garbage collection, and the garbage collection is initiated, the electronic device may verify a variable value of a flag set in the runtime environment. In this case, the setting of the flag for skipping the garbage collection may be setting of a variable value of the flag. For example, when an API for setting a flag is called by the application, the runtime environment may set the variable value of the flag set in the runtime environment to 'true', and accordingly, when the garbage collection for the application is initiated, the electronic device may control the garbage collection to be skipped.

According to an example embodiment, the electronic device may clear the flag by changing the variable value of the flag set in the runtime environment after a predetermined time elapses. As another example, the electronic device may set the variable value of the flag set in the runtime environment to 'false', and accordingly, when the garbage collection for the application is initiated, the electronic device may control the garbage collection to be performed. In this case, the electronic device may perform the garbage collection, and as in a typical Android terminal, after performing the garbage collection, reset the bound memory value and the threshold value of the garbage collection. The setting and clearing of a flag will be described in greater detail below with reference to FIG. 9.

In operation 831, when a memory value allocated to the application exceeds the threshold value, the electronic device may determine whether the memory value allocated to the application exceeds the bound memory value.

When the memory value allocated to the application exceeds the threshold value, the electronic device may update the bound memory value and the threshold value of the garbage collection, based on a maximum allowable free memory value ('heapmaxfree') for the application. However, according to whether the memory value allocated to the application exceeds the bound memory value, the electronic device may determine whether to apply a weight that is used in updating, which will be described in greater detail below with reference to operations 841 and 842.

In operation 841, in response to the memory value allocated to the application exceeding an existing bound memory value, the electronic device may update the bound memory value, based on the maximum allowable free memory value ('heapmaxfree') and a weight preset for the electronic device. For example, the bound memory value may be updated to a value calculated by adding up the bound memory value to a value obtained by applying the preset weight to the maximum allowable free memory value for the application.

The bound memory value may be updated based on Equation 3.

updated bound memory value=bound memory value+(maximum allowable free memory value×preset weight)   [Equation 3]

Referring to Equation 3, when the memory value allocated to the application exceeds the bound memory value yet to be updated, the electronic device may need to considerably increase a range of a memory value to be used by the application. Accordingly, the electronic device may increase the bound memory value by a value calculated by multiplying a maximum allowable memory value, which is a maximum value of a free memory allowed for an application process, by a weight.

According to an example embodiment, when updating a bound memory value, the electronic device may change a weight to be applied and change a point in time of a first garbage collection to be performed after initiation of a target event. The electronic device may set the weight to an increased weight that is to be applied to the maximum allowable free memory value and thus delay a first garbage collection to be performed after the initiation of the target event.

As to be described below with reference to FIG. 9, the electronic device may skip an initiated garbage collection from when an event associated with an application is initiated to when a flag set in a runtime environment is cleared. After the flag set in the runtime environment is cleared, the electronic device may initiate and perform a garbage collection. A garbage collection for an application may be initiated when a memory value allocated to the application exceeds a threshold value, and the threshold value of the garbage collection may be determined based on a bound memory value. Accordingly, when the electronic device updates the bound memory value using the increased weight, the threshold value may also be updated to an increased value. Therefore, a point in time of a first garbage collection to be performed after initiation of a target event may be delayed. A preset weight may be, for example, a value between 2.0 and 4.0, and in an Android terminal, may generally be set to 3.0. However, the preset weight may not be limited the foregoing example and may vary depending on a memory state of the electronic device.

In operation 842, in response to a memory value allocated to an application being less than or equal to an existing bound memory value, the electronic device may update a bound memory value using a maximum allowable free memory value. For example, the bound memory value may be updated to a value calculated by adding up the bound memory value to a maximum allowable free memory value for the application. The bound memory value may be updated based on Equation 4.

updated bound memory value=(bound memory value)+(maximum allowable free memory value)   [Equation 4]

When a garbage collection is performed in a typical Android terminal, based on Equation 4, a bound memory value for an application may be updated based on a value obtained by applying a weight to a free memory value allowed for the application. In this case, the bound memory value and a threshold value of the garbage collection may be updated based on a relatively small allowable free memory value, and the garbage collection may thus be reinitiated during the occurrence of an event.

Referring to a method of minimizing/reducing a garbage collection upon an application entry in a high-specification memory terminal, according to comparative example embodiments, when a process for the application is forked, a bound memory value is updated to a maximum heap memory value for the application. In this case, the bound memory value and a threshold value of the garbage collection is updated to a relatively large maximum heap memory value, the garbage collection may not be readily performed after the update. According to a comparative example embodiment, a method of minimizing/reducing a garbage collection may readjust a bound memory value and a threshold value by forcibly calling and executing the garbage collection after an application entry is completed, and consuming a CPU resource for such readjustment may affect a UX.

However, according to an example embodiment, the electronic device may skip a garbage collection when the garbage collection is initiated and update a bound memory value, based on a maximum allowable free memory value ('heapmaxfree'). Therefore, during the occurrence of a target event, the garbage collection is less likely to be initiated, and even after termination of the target event, the garbage collection may not need to be forcibly called.

In addition, the electronic device may update the bound memory value and a threshold value to avoid a garbage collection initiated during the occurrence of a target event associated with an application. Accordingly, the electronic device may not retrieve objects not used in the application at that point. However, a quantity of retrievable objects during the occurrence of the target event is not large, and thus, by updating the bound memory value and the threshold value at a minimum, a next garbage collection may be performed when there is additional memory allocation to the application.

In operation 850, the electronic device may update a threshold value of a garbage collection to a value calculated by subtracting a predetermined memory size value from an updated bound memory value. The predetermined memory size value may be, for example, 128 kilobytes but may not be limited thereto.

According to an example embodiment, the electronic device may change a predetermined memory size value to be subtracted when a threshold value of a garbage collection is updated, and thus change a point in time of a first garbage collection to be performed after initiation of a target event. By setting the predetermined memory size value to a decreased value, the electronic device may delay the first garbage collection to be performed after the initiation of the target event. The garbage collection is initiated when exceeding the threshold value of the garbage collection, and thus, as the threshold value is set nearer to the updated bound memory value, performing of a next garbage collection may be delayed.

In operation 860, after updating the threshold value of the garbage collection and the bound memory value, the electronic device may verify a flag set in a runtime environment of an application. In this case, the electronic device may enter operation 861 when the flag set in the runtime environment is cleared. For example, when a variable value of the flag set in the runtime environment is 'false', the electronic device may enter operation 861 and perform a garbage collection according to a garbage collection operation method of a typical Android terminal.

According to an example embodiment, from when a flag is set to when the flag is cleared, when a memory value newly allocated to an application exceeds an updated threshold value, a garbage collection may be skipped, and updating a bound memory value and a threshold value may be repeated. In other words, when a variable value of the flag set in the runtime environment is 'true', the electronic device may determine whether to skip the garbage collection again by verifying the flag variable value when a next garbage collection is initiated.

For example, when a memory value newly allocated to the application exceeds the updated threshold value of the garbage collection, and the next garbage collection is initiated, the electronic device may verify the flag variable value. In addition, when the flag in the runtime environment is not cleared, the electronic device may skip the initiated next garbage collection. However, the method of minimizing/reducing the garbage collection, according to an example embodiment, may not be limited to the foregoing examples. Multiple times of a garbage collection skipping operation (e.g., operation 811) may rather generate overhead, and thus, one garbage collection skipping operation may be performed. That is, operation 860 may be skipped, and after the performing of one garbage collection skipping operation, a garbage collection may be performed according to a garbage collection operation method of a typical Android terminal.

In operation 861, the electronic device may perform a garbage collection according to a garbage collection operation method of a typical Android terminal. According to an example embodiment, when the garbage collection is initiated after termination of a target event, the electronic device may perform the garbage collection according to the garbage collection operation method of the typical Android terminal. For example, the electronic device may repeat operation 811 of skipping the garbage collection, based on a memory value allocated to an application before the termination of the target event.

According to an example embodiment, when the garbage collection is initiated after the flag is cleared, the electronic device may perform the garbage collection according to the garbage collection operation method of the typical Android terminal. For example, the electronic device may repeat operation 811 of skipping the garbage collection, based on the memory value allocated to the application before the flag is cleared.

When the garbage collection is performed according to the typical garbage collection operation method, a bound memory value and a threshold value may be updated based on a memory value allocated to the application and a free memory value allowed for the application at that point.

Figure 9:
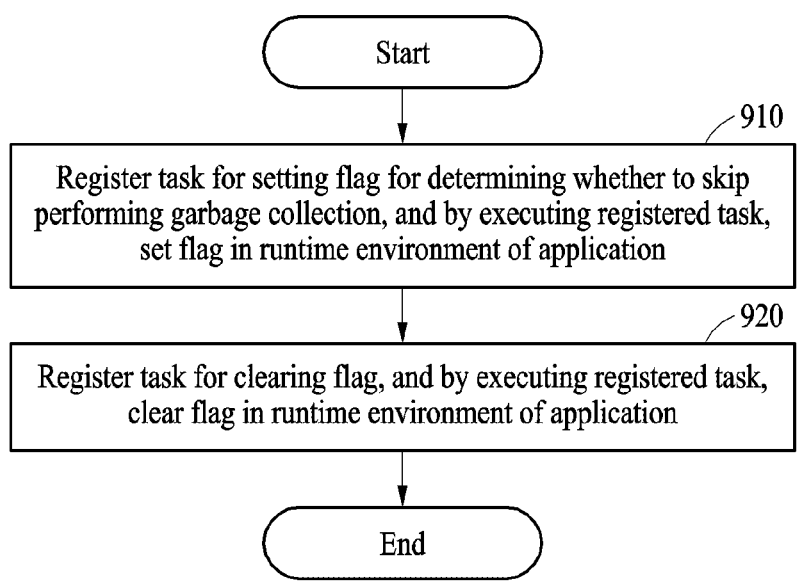
FIG. 9 is a flowchart illustrating an example process of setting and clearing a flag for determining whether to perform a garbage collection by an electronic device, according to various embodiments.

FIG. 9 is a flowchart illustrating an example process of setting and clearing a flag for determining whether to perform a garbage collection by an electronic device, according to various embodiments.

In operation 910, the electronic device (e.g., the electronic device 101 of FIG. 1) may set a flag for determining whether to skip the performing of the garbage collection in a runtime environment of an application. The electronic device may register a task for setting a flag for skipping the performing of the garbage collection in a task pool, and when the application calls an API for setting a flag, by executing the registered task, may set the flag in the runtime environment.

For example, when a target event associated with the application is initiated, the application may call the API and transmit the initiation of the target event to the runtime environment of the application. When the application calls the API for transmitting the initiation of the target event, a flag variable may be set in the runtime environment of the application. For example, when the target event associated with the application is initiated, generating an activity thread may be requested from Zygote by an activity manager service, and a handleLaunchActivity function in the activity thread may be called. When the handleLaunchActivity function is called, the application may call the API for setting the flag in the runtime environment of the application, and the called API may set the flag in the runtime environment of the application. For example, the electronic device may register a task for setting a flag for avoiding a garbage collection in a task pool, and when the application calls an API for setting a flag, by executing the registered task, may set the flag in the runtime environment.

The electronic device may determine initiation of a garbage collection when a memory value allocated to the application exceeds a threshold value of the garbage collection after a target event associated with the application is initiated. When the initiation of the garbage collection is determined, the electronic device may determine whether to skip performing the garbage collection, based on the flag set in the runtime environment.

For example, setting a flag may refer to setting a variable value of the flag, and when the electronic device sets the flag in the runtime environment of the application through the API, the variable value of the flag may be set to 'true'. In this case, after the initiation of the garbage collection is determined, the electronic device may verify the variable value of the flag set in the runtime environment before performing the garbage collection, and when the variable value of the flag is 'true', may skip the performing of the garbage collection. According to an example embodiment, instead of skipping the garbage collection, the electronic device may update a bound memory value and a threshold value of the garbage collection, based on a maximum allowable memory value. For example, the electronic device may update the bound memory value and the threshold value of the garbage collection, based on an operation (e.g., operation 831) of comparing a memory value allocated to the application with the bound memory value, as described above with reference to FIG. 8. The clearing of a flag will be described in greater detail below.

In operation 920, the electronic device may clear a flag set in the runtime environment of the application. The electronic device may register a task for clearing the flag in a task pool, and by executing the task when a predetermined condition is satisfied, may clear the flag set in the runtime environment of the application.

According to an example embodiment, the predetermined condition may be a condition that a predetermined time elapses from when the flag is set. The electronic device may clear the flag after the predetermined time elapses from when the flag is set. For example, the electronic device may register a task for clearing the flag in a task pool and set the registered task to be executed when the predetermined time elapses from when the flag is set. In other words, when the predetermined time elapses from when the flag is set in the runtime environment of the application, the electronic device, by executing the task for clearing the flag, may clear the flag set in the runtime environment.

The electronic device may determine the predetermined time, based on an average time needed from initiation of a target event to termination of the target event. For example, the electronic device may determine the predetermined time as a time longer than an average time needed until the target event is terminated. In this case, the electronic device may clear the flag set in the runtime environment usually after the target event is terminated, and thus, performing a garbage collection may be skipped while the target event is being executed, and the UX may not be affected.

According to an example embodiment, the predetermined condition may be a condition that an API for requesting the clearing of the flag is called. The electronic device may transmit the termination of the target event to the runtime environment of the application, and in response to the termination of the target event transmitted to the runtime environment, may clear the flag set in the runtime environment.

For example, the application may call an API for transmitting the termination of the target event. The application may also call an API for requesting the clearing of the flag set in the runtime environment upon the termination of the target event. When the application calls the API for requesting the clearing of the flag, the electronic device may clear the flag set in the runtime environment. For example, the electronic device may register a task for clearing a flag for avoiding a garbage collection in a task pool, and when the application calls an API for clearing a flag, may clear the flag set in the runtime environment by executing the registered task.

Furthermore, the electronic device may simultaneously register a task for clearing a flag when a predetermined time elapses from a set point in time and a task for clearing a flag when an application calls an API for clearing the flag in a task pool. In this case, the electronic device may clear the flag set in a runtime environment at an earlier time between a point in time when the predetermined time elapses from when the flag is set and a point in time when the API for clearing the flag is called upon the termination of the target event. After the flag set in the runtime environment is cleared, when a memory value allocated to the application exceeds a threshold value of the garbage collection, the garbage collection may be performed according to a garbage collection operation method of a typical Android terminal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an electronic device, the method comprising:
based on a target event associated with an application being initiated, transmitting the initiation of the target event to a runtime environment of the application, and
after transmitting the initiation of the target event to the runtime environment, based on a memory value allocated to the application exceeding a threshold value for determining whether to initiate a garbage collection, skipping performing the garbage collection and updating a bound memory value, defined in the garbage collection, and the threshold value.

2. The method of claim 1, wherein:
the transmitting of the initiation of the target event to the runtime environment comprises:
setting a flag for determining whether to skip the performing of the garbage collection in the runtime environment, and
the updating comprises:
based on the flag set in the runtime environment, determining whether to skip the performing of the garbage collection.

3. The method of claim 2, further comprising:
clearing the flag after a specified time elapses from when the flag is set.

4. The method of claim 2, further comprising:
based on the target event being terminated, transmitting the termination of the target event to the runtime environment, and
in response to the termination of the target event transmitted to the runtime environment, clearing the flag.

5. The method of claim 1, wherein:
the updating comprises:
based on a maximum allowable free memory value for the application, updating the bound memory value and the threshold value.

6. The method of claim 1, wherein:
the updating comprises:
in response to the memory value allocated to the application exceeding the bound memory value, updating the bound memory value to a value calculated by adding the bound memory value to a value obtained by applying a specified weight to a maximum allowable free memory value for the application.

7. The method of claim 6, wherein:
the updating comprises:
by setting the specified weight to an increased weight, delaying a first garbage collection to be performed after the initiation of the target event.

8. The method of claim 6, wherein:
the updating comprises:
updating the threshold value to a value calculated by subtracting a specified memory size value from the updated bound memory value.

9. The method of claim 1, wherein:

the updating comprises:

in response to the memory value allocated to the application being less than or equal to the bound memory value, updating the bound memory value by adding the bound memory value to a maximum free memory value for the application.

10. The method of claim 2, further comprising:

from the flag being set to the flag being cleared, based on a memory value newly allocated to the application exceeding the updated threshold value, skipping the performing of the garbage collection and repeating the updating.

11. The method of claim 2, further comprising:

based on the garbage collection being performed after the flag is cleared, based on a memory value allocated to the application based on the garbage collection being performed and a free memory value allowed for the application, updating the bound memory value and the threshold value.

12. A non-transitory computer-readable storage medium storing instructions that, when executed by a processor, cause the processor to perform the operations of claim 1.

13. An electronic device comprising:

a processor configured to: based on a target event associated with an application being initiated, transmit initiation of the target event to a runtime environment of the application, after transmitting the initiation of the target event to the runtime environment, based on a memory value allocated to the application exceeding a threshold value for determining whether to initiate a garbage collection, skip performing the garbage collection and update a bound memory value, defined in the garbage collection, and the threshold value.

14. The electronic device of claim 13, wherein:

the processor is configured to:

set a flag for determining whether to skip the performing of the garbage collection, and based on the flag set in the runtime environment, determine whether to skip the performing of the garbage collection.

15. The electronic device of claim 14, wherein:

the processor is configured to:

clear the flag based on a specified time elapsing from when the flag is set.

16. The electronic device of claim 14, wherein:

the processor is configured to:

based on the target event being terminated, transmit the termination of the target event to the runtime environment, and in response to the termination of the target event transmitted to the runtime environment, clear the flag.

17. The electronic device of claim 13, wherein:

the processor is configured to:

based on a maximum allowable free memory value for the application, update the bound memory value and the threshold value.

18. The electronic device of claim 13, wherein:

the processor is configured to:

in response to the memory value allocated to the application exceeding the bound memory value, update the bound memory value to a value calculated by adding the bound memory value to a value obtained by applying a specified weight to a maximum allowable free memory value for the application.

19. The electronic device of claim 18, wherein:

the processor is configured to:

update the threshold value to a value calculated by subtracting a specified memory size value from the updated bound memory value.

20. The electronic device of claim 13, wherein:

the processor is configured to:

in response to the memory value allocated to the application being less than or equal to the bound memory value, update the bound memory value by adding the bound memory value to a maximum free memory value for the application.

* * * * *